July 14, 1931.                S. T. THORPE                 1,814,234
                              FISHING REEL
                          Filed Feb. 7, 1929
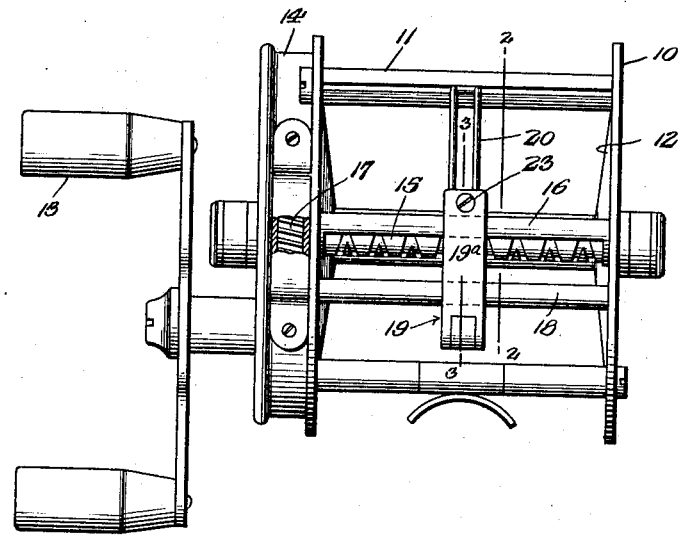
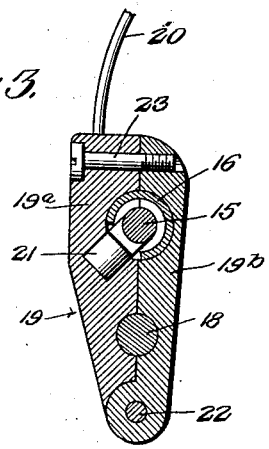
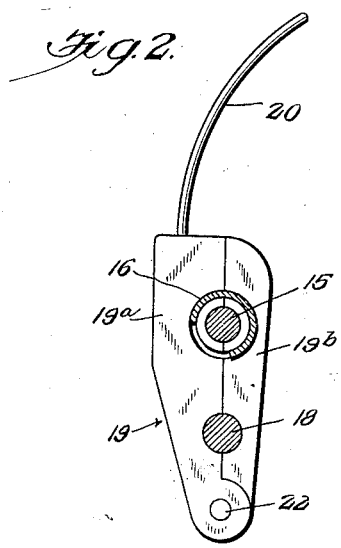
Inventor
Samuel T. Thorpe
By Church & Church
his Attorneys Patented July 14, 1931

1,814,234

UNITED STATES PATENT OFFICE

SAMUEL T. THORPE, OF BRISTOL, CONNECTICUT, ASSIGNOR TO THE HORTON MANUFACTURING COMPANY, OF BRISTOL, CONNECTICUT, A CORPORATION OF CONNECTICUT

FISHING REEL

Application filed February 7, 1929. Serial No. 338,172.

This invention relates to improvements in fishing reels and particularly to a line guiding device or attachment now found on a great many reels.

These line guiding attachments, which are for the purpose of insuring the line being wound level on the reel spool, generally comprise a line guide carriage provided with a driving pawl which engages a traversing shaft rotated by the reel handle whereby the carriage will be reciprocated longitudinally of the spool drum. In many instances, the construction of the attachment is such that the reel itself must be at least partially dismantled if it is desired to remove the line guide carriage—for instance, when the attachment has, for some reason, become inoperative.

It is the elimination of this feature that constitutes the primary object of the present invention.

A further object is to simplify the attachment by utilizing as few number of parts as possible and by having the several parts of the line guide carriage removable as a unit.

More specifically, the invention consists in forming the line guide carriage of two separable sections hinged together and held on a steadying bar and the traversing shaft by a screw connecting the two sections, the several parts of the carriage, including the screw being removable as a unit.

With these and other objects in view, the invention consists in certain details of construction and combinations and arrangements of parts, all as will hereinafter be more fully described, and the novel features thereof particularly pointed out in the appended claims.

In the accompanying drawings,

Figure 1 is an elevational view of a reel, embodying the preferred form of the present invention;

Fig. 2 is a sectional view on the line 2—2 of Fig. 1; and

Fig. 3 is a similar view on the line 3—3 of Fig. 1.

In accordance with usual practice the reel comprises a frame formed of end plates 10 and spacer rods 11. Journaled in the end plates is the spool 12 adapted to be rotated by handle 13 through suitable gearing which is enclosed by a housing 14, mounted on one of said end plates. The reel itself forming no part of the present invention, a further detailed showing or description of its construction is unnecessary.

Journaled in the end plates 10, near the periphery thereof, is a traversing screw shaft 15 partially enclosed by a tubular steadying bar 16. Shaft 15 is rotatable by a gear 17 actuated by the gears which drive spool 12. Mounted in said end plates and extending parallel to shaft 15 is a guide bar 18. The carriage 19 for the line guide 20 is slidable on said bar 18 along the shaft 15 and steadying bar 16, bridging the space between said members. Held in the carriage is a driving pawl 21 which normally engages in the groove in shaft 15, whereby rotation of said shaft will reciprocate the carriage on said bars.

In order that said carriage may be readily removed, it is made of two separable sections embracing the guide bar and shaft. Preferably, one section 19a which constitutes the major portion of the carriage lies on the outer side of the bars and carries the line guide 20 and the driving pawl 21. The other section 19b lies beneath the bars and is hinged at one end to section 19a by a pin 22. At their opposite ends, said sections, are adapted to be secured together by a screw 23 threaded through section 19a into section 19b. Such a construction of line guide carriage permits it to be quickly removed by simply withdrawing screw 23 from section 19b, permitting the two sections to be opened on the hinge pin. No portion or element of the reel proper need be removed. Hence, if the attachment becomes inoperative while in use the carriage may be removed without interfering with the fishing line and the necessary repairs made or the reel used without the attachment.

It might be added that other arrangements of the guide bar and steadying bar may be used, so far as the particular construction of the carriage is concerned although the present arrangement is preferable where the carriage is composed of pivotally connected sections.

What I claim is:

1. In a fishing reel, a frame, a spool, a traversing shaft, a guide bar, a line guide carriage surrounding said shaft and bar and slidable thereon, said carriage comprising separable sections detachably connected together with each section only partially surrounding said shaft and bar, and a pawl in said carriage engaging said shaft.

2. In a fishing reel, a frame, a spool, a traversing shaft, a guide bar, said shaft and bar being fixed against longitudinal movement in said frame, a line guide carriage formed of separable sections detachably secured together, said carriage removably surrounding said shaft and bar and slidable on said members, and a pawl secured in one of said carriage sections engaging said shaft.

3. In a fishing reel, a frame, a spool, a traversing shaft, a guide bar, said shaft and bar being fixed against longitudinal movement in said frame, a line guide carriage surrounding and slidable on said shaft and bar, said carriage being directly removable from said bar and shaft, and a pawl in said carriage engaging said shaft.

4. In a fishing reel, a frame, a spool, a traversing shaft, a guide bar, a line guide carriage formed of separable sections slidable on said shaft and bar, said carriage sections being pivotally connected together whereby they may be removed from said bar and shaft as a unit, means for retaining said pivoted sections on said bar and shaft, and a pawl in said carriage engaging said shaft.

5. In a fishing reel, a frame, a spool, a traversing shaft, a guide bar spaced to one side of said shaft and extending parallel thereto, a line guide carriage formed of separable sections jointly completely surrounding said bar and shaft, said carriage being removably and slidably mounted on said bar and shaft, and a pawl in said carriage engaging said shaft.

6. In a fishing reel, a frame, a spool, a traversing shaft, a guide bar spaced to one side of said shaft, a line guide carriage formed of pivotally connected sections bridging the space between said bar and shaft, said carriage being slidable on said bar longitudinally of said shaft, and a pawl in said carriage engaging said shaft.

7. In a fishing reel, a frame, a spool, a traversing shaft, a guide bar spaced to one side of said shaft, a line guide carriage formed of separable sections detachably secured together, said sections bridging the space between said bar and shaft and being slidable on said bar longitudinally of said shaft, and each section only partially embracing said bar and a pawl in said carriage engaging said shaft.

8. In a fishing reel, a frame, a spool, a traversing shaft, a guide bar spaced to one side of said shaft, a line guide carriage formed of separable sections bridging the space between said bar and shaft, said carriage being slidable on said bar longitudinally of the shaft, with each section only partially embracing said bar and a driving connection between said shaft and carriage.

9. In a fishing reel, a frame, a spool, a traversing shaft, a guide bar spaced to one side of said shaft, a line guide carriage formed of separable sections bridging the space between said bar and shaft, said sections being pivotally connected at one end and detachably connected at their opposite ends, said carriage being slidable on said bar longitudinally of said shaft, and a pawl in said carriage engaging said shaft.

SAMUEL T. THORPE.